US012650175B2

(12) United States Patent
 Hirota

(10) Patent No.: US 12,650,175 B2
(45) Date of Patent: Jun. 9, 2026

(54) PRESSURE RELIEF VALVE

(71) Applicant: NIFCO INC., Yokosuka (JP)

(72) Inventor: Shohei Hirota, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 18/848,518

(22) PCT Filed: May 10, 2023

(86) PCT No.: PCT/JP2023/017630
 § 371 (c)(1),
 (2) Date: Sep. 19, 2024

(87) PCT Pub. No.: WO2023/233954
 PCT Pub. Date: Dec. 7, 2023

(65) Prior Publication Data
 US 2025/0207677 A1 Jun. 26, 2025

(30) Foreign Application Priority Data
 May 30, 2022 (JP) ................................. 2022-087947

(51) Int. Cl.
 *F16K 17/04* (2006.01)
 *H01M 50/317* (2021.01)
(52) U.S. Cl.
 CPC ......... *F16K 17/046* (2013.01); *H01M 50/317* (2021.01)
(58) Field of Classification Search
 CPC ........ F16K 17/20–17/32; F16K 17/046; F16K 17/025; F16K 11/078; H01M 50/317; H01M 50/204; H01M 50/308; Y02E 60/10

(Continued)

(56) References Cited

U.S. PATENT DOCUMENTS 1,237,203 A * 8/1917 Guill et al. ............ G05D 13/00
                                                    137/499
1,697,937 A * 1/1929 Trotter .................. F16K 17/044
                                                    137/469

(Continued)

FOREIGN PATENT DOCUMENTS

JP       2013-168293 A      8/2013
JP       2019-220592 A     12/2019

(Continued)

OTHER PUBLICATIONS

PCT/ISA/210, "International Search Report for International Application No. PCT/JP2023/017630," Aug. 1, 2023, 4pp.

*Primary Examiner* — Jessica Cahill
(74) *Attorney, Agent, or Firm* — HAUPTMAN HAM, LLP

(57) ABSTRACT

A pressure relief valve includes a case having an opening and fixed to a surface of a housing, a cover supported by the case rotatably in a rotation direction parallel to the surface of the housing, and a first biasing member biasing the cover such that the cover rotates from a closed position to an open position in the rotation direction. The cover covers an opening of the cover in the closed position and opens the opening of the cover in the open position. The case includes a stopper engaging with the cover in the closed position. The pressure relief valve releases the engagement between the stopper and the cover when internal pressure of the housing exceeds a threshold value.

6 Claims, 8 Drawing Sheets

(58) Field of Classification Search
USPC .......................................................... 251/56
See application file for complete search history.

(56) References Cited

U.S. PATENT DOCUMENTS

| | | | | |
|---|---|---|---|---|
| 2,519,990 | A * | 8/1950 | Wolfe | B27B 17/12 |
| | | | | 137/197 |
| 4,238,020 | A * | 12/1980 | Nerstad | F16D 43/284 |
| | | | | 251/282 |
| 2011/0052947 | A1 * | 3/2011 | Joswig | H01M 50/317 |
| | | | | 429/54 |
| 2012/0169195 | A1 * | 7/2012 | Eckstein | H01M 50/342 |
| | | | | 312/229 |
| 2019/0219183 | A1 | 7/2019 | Hall-Snyder et al. | |
| 2021/0148478 | A1 | 5/2021 | Yue et al. | |
| 2021/0265697 | A1 | 8/2021 | Nakayama et al. | |
| 2022/0223970 | A1 * | 7/2022 | Okabayashi | F16K 17/08 |
| 2022/0344770 | A1 * | 10/2022 | Li | F16K 17/196 |

FOREIGN PATENT DOCUMENTS

| | | | | | |
|---|---|---|---|---|---|
| JP | 2020-021897 | A | | 2/2020 | |
| JP | 2020-194719 | A | | 12/2020 | |
| JP | 2021-093355 | A | | 6/2021 | |
| JP | 6897730 | B2 | | 7/2021 | |
| WO | WO-2008127332 | A1 * | 10/2008 | | F16K 31/002 |
| WO | WO-2023127416 | A1 * | 7/2023 | | H01G 11/14 |

* cited by examiner

PRESSURE RELIEF VALVE

RELATED APPLICATIONS

The present application is National Phase of International Application No. PCT/JP2023/017630 filed May 10, 2023, and claims priority from Japanese Application No. 2022-087947, filed May 30, 2022.

FIELD

The present invention relates to a pressure relief valve that regulates pressure inside a housing.

BACKGROUND

Pressure relief valves are devices for regulating pressure inside a housing. The housing is, for example, a battery pack installed in an automobile. The battery pack has devices, such as a battery cell accommodated and sealed in its inside. The pressure relief valve is provided to the housing of, for example, the battery pack. For example, the pressure relief valve is positioned so as to cover an opening formed in the housing. The pressure relief valve operates to discharge fluid inside the housing to the outside when pressure inside the housing exceeds a threshold value. The pressure relief valve can suppress damage to devices inside the housing caused by increased pressure.

Some pressure relief valves have been proposed.

For example, Patent Literature 1 discloses a pressure relief valve comprising a base provided to an opening of a housing and a cover covering the base. The cover is subjected to a biasing force toward the base. When internal pressure exceeds a threshold value, the cover moves away from the base in a normal direction of a surface of the housing. Fluid inside the housing is discharged to the outside through a gap between the base and the cover and a gap between the cover and the housing.

For example, Patent Literature 2 discloses a pressure relief valve comprising a plurality of small holes penetrating through a wall of a housing, and a sheet covering the small holes. When internal pressure exceeds a threshold value, the sheet breaks and the small holes open. Fluid inside the housing is discharged to the outside through the small holes.

CITATION LIST

Patent Literature

Patent Literature 1: Japanese Unexamined Patent Application Publication No. 2020-21897
Patent Literature 2: Japanese Patent No. 6897730

SUMMARY

Technical Problem

In the pressure relief valve described in Patent Literature 1, fluid flow is restricted by a gap between a base and a cover, and a gap between the cover and a housing. In addition, a degree of freedom in designing a layout of the pressure relief valve is small because of larger dimensions of the valve in a normal direction of a surface of the housing. In the pressure relief valve described in Patent Literature 2, fluid flow is inhibited by a broken sheet.

Solution to Problem

The present invention aims at providing a pressure relief valve that can solve such problems.

The present invention is a pressure relief valve configured to release fluid from a housing when internal pressure of the fluid inside the housing increases, the pressure relief valve comprising:

a case including an opening and configured to be fixed to a surface of the housing;

a cover supported by the case rotatably in a rotation direction parallel to the surface of the housing; and a first biasing member for biasing the cover such that the cover rotates from a closed position to an open position in the rotation direction, wherein the cover covers the opening of the case in the closed position and opens the opening of the case in the open position, the case includes a stopper engaging the cover in the closed position, and the pressure relief valve releases engagement between the stopper and the cover when the internal pressure of the housing exceeds a threshold value.

The pressure relief valve according to the present invention may include a second biasing member to bias the cover in a direction that the cover member is directed toward the case.

In the pressure relief valve according to the present invention, the cover may include a first lock engaging the stopper of the case in the closed position.

In the pressure relief valve according to the present invention, the cover may include a tube part. The case may include a shaft inserted into the tube part and functioning as a rotation shaft in the rotation direction. The first lock may protrude outward from the tube part.

In the pressure relief valve according to the present invention, the cover may include a second lock engaging with the stopper of the case in the open position.

The present invention achieves a higher flow rate of the fluid discharged to the outside. The present invention also achieves a higher degree of freedom in designing a layout of the pressure relief valve.

DESCRIPTION OF THE EMBODIMENTS

Figure 1:
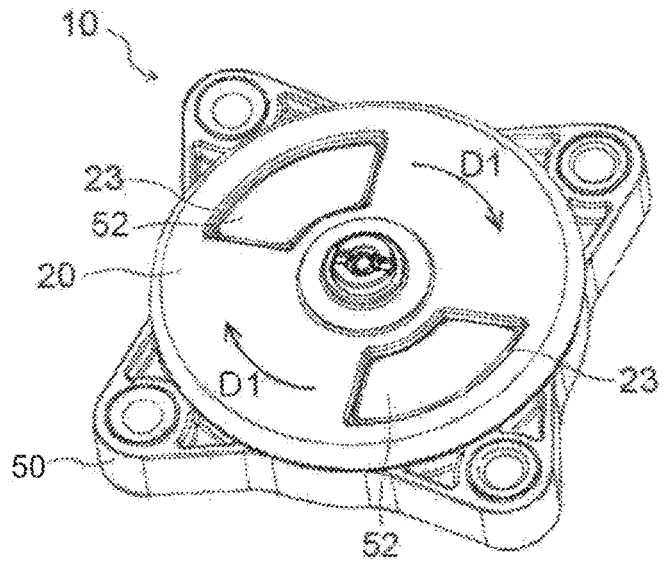
FIG. 1 is a perspective view illustrating a pressure relief valve in a closed state.

An embodiment of the present invention will be described with reference to the drawings. In the drawings attached to the present application, scales and aspect ratios and so on are appropriately changed and exaggerated as compared to those of actual products in order for convenience of easier understanding.

Figure 2:
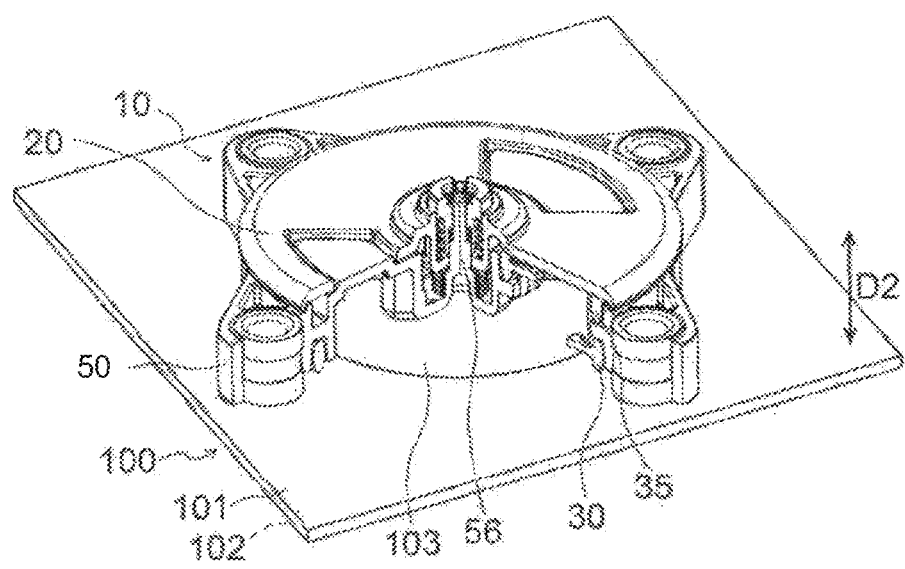
FIG. 2 is a partial sectional view illustrating the pressure relief valve provided to a housing.

FIG. 1 is a perspective view illustrating an example of a pressure relief valve 10. The pressure relief valve 10 is attached to a housing 100. FIG. 2 is a partial sectional view illustrating the pressure relief valve 10 attached to the housing 100. The housing 100 is, for example, a battery pack installed in an automobile. The battery pack has devices, such as a battery cell accommodated and sealed in its inside. The housing 100 includes a front face 101 and a back face 102. The front face 101 is in contact with an atmosphere outside the housing 100. The back face 102 is in contact with an internal space sealed by the housing 100. The housing 100 includes a vent 103 penetrating through the housing 100. The pressure relief valve 10 is attached to the housing 100 so as to cover the vent 103.

The pressure relief valve 10 operates to discharge fluid, such as gas, inside the housing 100 to the outside when pressure inside the housing 100 exceeds a threshold value. The pressure inside the housing 100 is also referred to as internal pressure.

Figure 3:
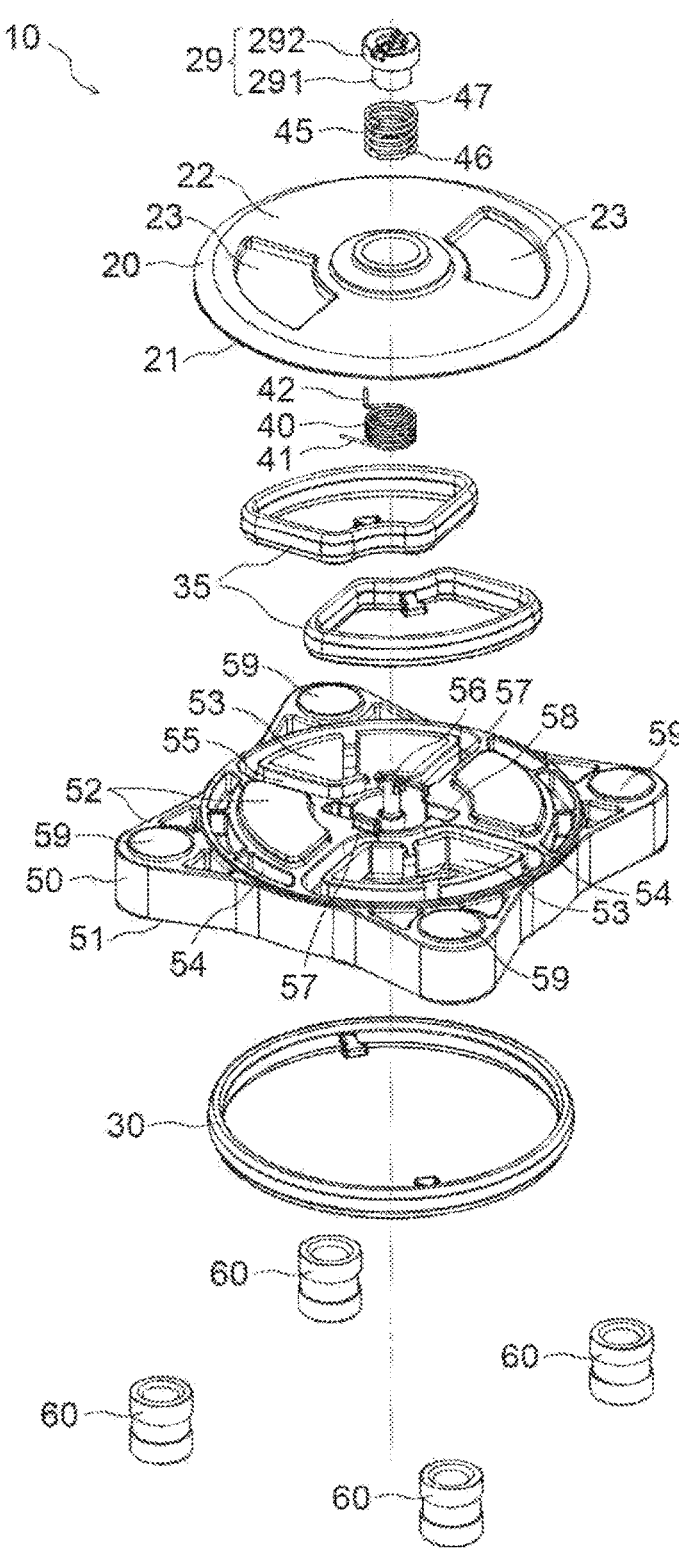
FIG. 3 is an exploded view illustrating the pressure relief valve.

The pressure relief valve 10 will be described in detail. FIG. 3 is an exploded view illustrating the pressure relief valve 10. The pressure relief valve 10 includes a cover 20, an end lock 29, a first seal 30, second seals 35, a first biasing member 40, a second biasing member 45, and a case 50. A modularized pressure relief valve 10 is obtained by assembling the cover 20, the end lock 29, the first seal 30, the second seals 35, the first biasing member 40, the second biasing member 45, and the case 50. The pressure relief valve 10 is attached to the housing 100 in a modularized state.

The cover 20 is supported rotatably in a rotation direction D1 parallel to the front face 101 of the housing 100. When the pressure inside the housing 100 exceeds a threshold value, the cover 20 rotates from a closed position to an open position in the rotation direction D1. FIGS. 1 and 2 each illustrate a state where the cover 20 is in the closed position. In the closed position of the cover 20, the vent 103 of the housing 100 is covered with the pressure relief valve 10. In the open position of the cover 20, the pressure relief valve 10 allows the vent 103 to communicate with the outside. In the present embodiment, the rotation of the cover 20 discharges a fluid inside the housing 100 to the outside, as described above.

Figure 4:
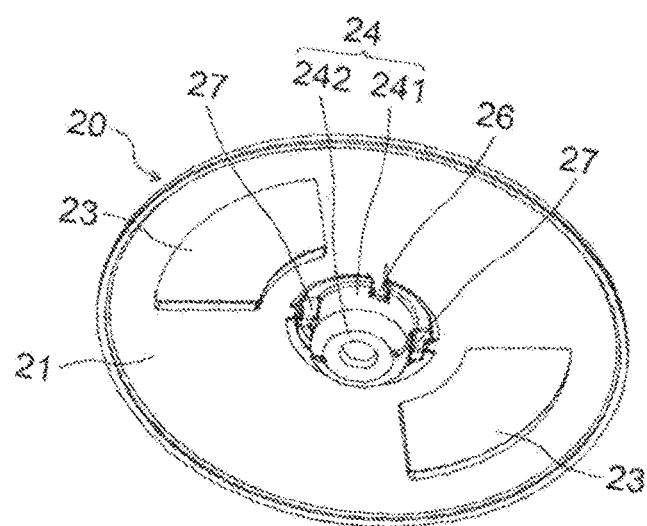
FIG. 4 is a view illustrating a cover as viewed from below.
Figure 5:
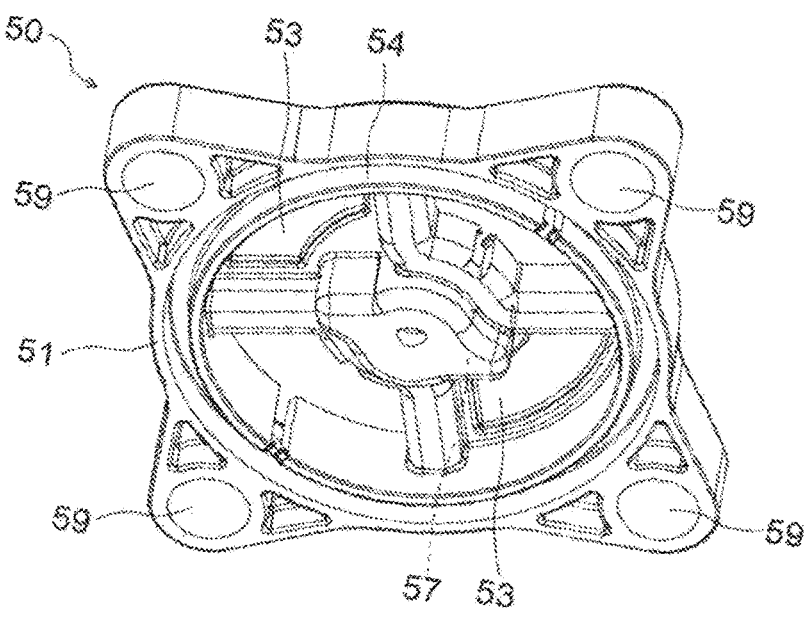
FIG. 5 is a view illustrating a case as viewed from below.

Each component of the pressure relief valve 10 will be described in detail with reference to FIGS. 1 to 5. FIG. 4 is a view illustrating the cover 20 as viewed from below. FIG. 5 is a view illustrating the case 50 as viewed from below. The term "as viewed from below" means that the pressure relief valve 10 is viewed in a direction from the housing 100 toward the pressure relief valve 10.

The normal direction of the front face 101 of the housing 100 is also referred to as a vertical direction and is denoted by a reference sign D2. In the vertical direction, the direction from the pressure relief valve 10 toward the housing 100 is also referred to as a downward direction or downward. In the vertical direction, the direction from the housing 100 toward the pressure relief valve 10 is also referred to as an upward direction or upward.

(Case)

The case 50 is fixed to the housing 100. The case 50 includes a lower face 51, an upper face 52, openings 53, and a shaft 56. The lower face 51 faces the front face 101 of the housing 100. The upper face 52 is positioned opposite to the lower face 51 in the vertical direction D2. The openings 53 penetrate the case 50 from the lower face 51 to the upper face 52. The shaft 56 extends in the vertical direction D2. The shaft 56 functions as a rotation shaft in the rotation direction D1.

The case 50 includes at least one opening 53. The case 50 may include two or more openings 53. In the present embodiment, the case 50 includes two openings 53 in an axisymmetric relationship. The outlines of the openings 53 may each include an arc shape with the shaft 56 as the center.

As illustrated in FIGS. 3 and 5, the case 50 may include a first accommodation part 54 positioned on the lower face 51. The first accommodation part 54 accommodates the first seal 30. The case 50 may include second accommodation parts 55 positioned on the upper face 52. The second accommodation parts 55 accommodate the second seals 35. The second accommodation parts 55 enclose the openings 53 in a plan view. The term "plan view" means that an object is viewed along the normal direction of the front face 101.

The case 50 may include stoppers 57. The stoppers 57 can regulate the position of the cover 20 in the rotation direction D1. For example, the stoppers 57 engage with the cover 20 in the closed position. The stoppers 57 may protrude upward from the upper face 52.

The case 50 may include a support 58. The support 58 supports a first end 41 of the first biasing member 40 in the rotation direction D1. For example, the support 58 contacts with the first end 41 of the first biasing member 40 to prevent the first end 41 from rotating in the rotation direction D1.

The case 50 may include fastening parts 59. The fastening parts 59 are, for example, holes into which fasteners 60 illustrated in FIG. 3 are inserted. The fasteners 60 are bolts, for example. The case 50 is fixed to the housing 100 by inserting the fasteners 60 into the fastening parts 59 of the case 50 and holes (not illustrated) in the housing 100, and fixing the fasteners 60 with nuts or the like (not illustrated).

(First Biasing Member)

The first biasing member 40 biases the cover 20 such that the cover 20 rotates from the closed position to the open position in the rotation direction D1. The first biasing member 40 is, for example, a spring coiled in the vertical direction D2. The first biasing member 40 includes the first end 41 in contact with the case 50, and a second end 42 in contact with the cover 20.

(Second Biasing Member)

The second biasing member 45 biases the cover 20 in a direction for advancing the cover 20 toward the case 50. The second biasing member 45 is, for example, a coil spring elastic in the vertical direction D2. The second biasing member 45 includes a lower end 46 in contact with a bottom 242 of a tube part 24 of the cover 20, and an upper end 47. The upper end 47 may be in contact with an upper part 292 of the end lock 29.

(Cover)

The cover 20 includes a lower face 21, an upper face 22, and openings 23. The lower face 21 faces the upper face 52 of the case 50. The upper face 22 is positioned opposite to the lower face 21 in the vertical direction D2. The openings 23 penetrate the cover 20 from the lower face 21 to the upper face 22.

The cover 20 in the closed position covers the openings 53 of the case 50. For example, the openings 23 of the cover 20 in the closed position do not overlap the openings 53 of the case 50 in a plan view. The cover 20 in the open position opens the openings 53 of the case 50. For example, the openings 23 of the cover 20 in the open position overlap the openings 53 of the case 50 in a plan view. This allows the fluid inside the housing 100 to be discharged to the outside through the openings 53 of the case 50 and the openings 23 of the cover 20.

The cover 20 includes at least one opening 23. The opening 23 may include two or more openings 23. In the present embodiment, the cover 20 includes two openings 23, in the same manner as the case 50. The outlines of the openings 23 may each include an arc shape with the shaft 56 as the center. In a plan view, the outlines of the openings 23 may be enclosed by the openings 53. In a plan view, the openings 23 may enclose the outlines of the openings 53.

The cover 20 is supported rotatably in the rotation direction D1 by the shaft 56 of the case 50. For example, the cover 20 may include the tube part 24, as illustrated in FIG. 4. The tube part 24 may protrude downward from the lower face 21. The tube part 24 is connected to the shaft 56 of the case 50. For example, the tube part 24 includes a side 241 having a tubular shape, and the bottom 242 with a hole into which the shaft 56 is inserted.

The cover 20 is subjected to a biasing force from the first biasing member 40 in the rotation direction D1. To counter the biasing force, the cover 20 may include first locks 26, as illustrated in FIG. 4. The first locks 26 engage with the stoppers 57 of the case 50 in the closed position. This prevents the cover 20 from rotating with respect to the case 50 in the closed position. As illustrated in FIG. 4, the first locks 26 may protrude outward in a radial direction from the side 241 of the tube part 24.

As illustrated in FIG. 4, the cover 20 may include second locks 27. The second locks 27 engage with the stoppers 57 of the case 50 in the rotation direction D1, as described below. This allows the cover 20 to rest in the open position in the rotation direction D1. As illustrated in FIG. 4, the second locks 27 may protrude outward in the radial direction from the side 241 of the tube part 24.

The cover 20 may be supported by the case 50 such that the cover 20 is movable in the vertical direction D2 between the upper and lower positions. The first locks 26 of the cover 20 engage with the stoppers 57 of the case 50 in the lower position. The upper position is above the lower position. The first locks 26 of the cover 20 cannot engage with the stoppers 57 of the case 50 in the upper position. The second locks 27 of the cover 20 can engage with the stoppers 57 of the case 50 in the upper position.

(End Lock)

The end lock 29 is fixed to the case 50. For example, the end lock 29 includes a side 291 having a tubular shape into which the shaft 56 of the case 50 fits, and the upper part 292. The upper part 292 contacts with the second biasing member 45 from above.

(First Seal)

The first seal 30 is positioned between the lower face 51 of the case 50 and the front face 101 of the housing 100. The first seal 30 encloses the openings 53 in a plan view. The first seal 30 is, for example, a gasket.

(Second Seal)

The second seals 35 are positioned between the upper face 52 of the case 50 and the lower face 21 of the cover 20. One second seal 35 may enclose one opening 23 in a plan view. In this case, the number of the second seals 35 is the same as the number of the openings 23. The second seals 35 are, for example, gaskets.

Figure 6:
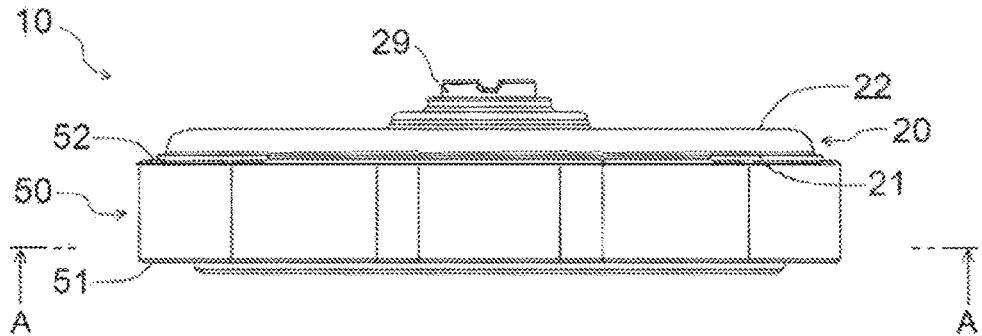
FIG. 6 is a side view illustrating the pressure relief valve in a state where the cover is in a closed position.
Figure 7:
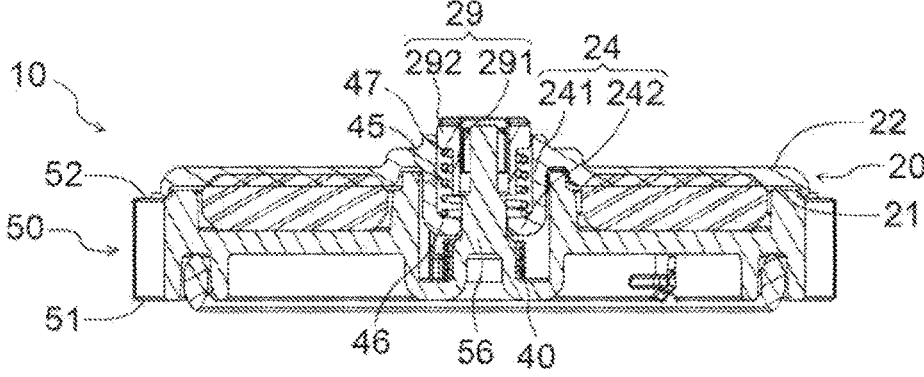
FIG. 7 is a vertical sectional view illustrating the pressure relief valve in a state where the cover is in the closed position.
Figure 8:
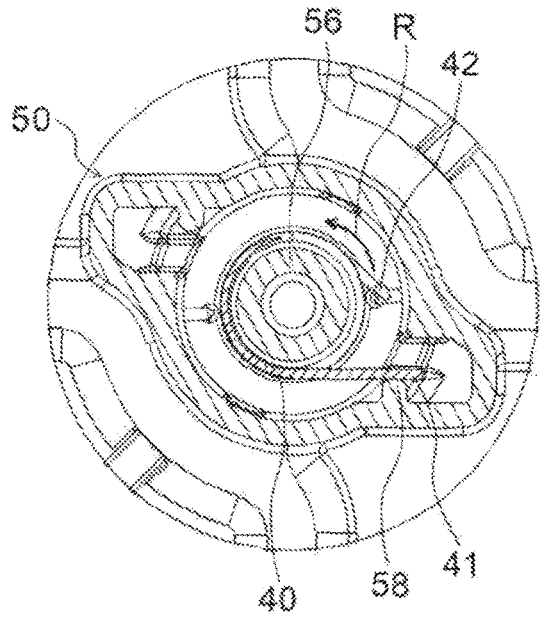
FIG. 8 is a sectional view illustrating a first biasing member in a state where the cover is in the closed position.
Figure 9:
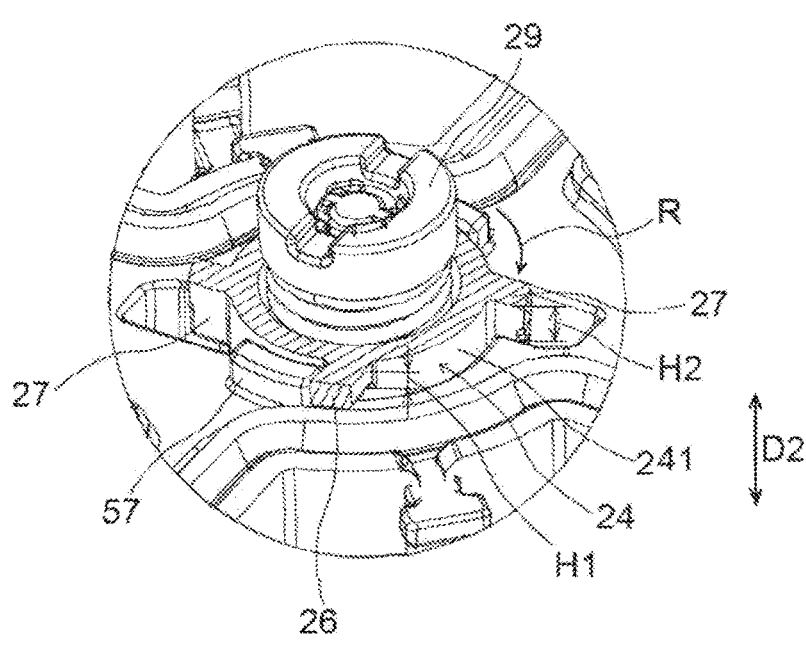
FIG. 9 is a view illustrating a tube part and locks of the cover sectioned by a plane parallel to a rotation direction.

Next, with reference to FIGS. 6 to 9, the positional relationship of components of the pressure relief valve 10 will be described in detail. FIG. 6 is a side view illustrating the pressure relief valve 10 in a state where the cover 20 is in the closed position. FIG. 7 is a vertical sectional view illustrating the pressure relief valve 10 in a state where the cover 20 is in the closed position. FIG. 8 is a sectional view illustrating the first biasing member 40 in a state where the cover 20 is in the closed position. FIG. 8 corresponds to a sectional view along line A-A in FIG. 6. FIG. 9 is a view illustrating a case where the tube part 24 and the locks 26, 27 of the cover 20 are cut by a plane parallel to the rotation direction.

As illustrated in FIG. 7, the shaft 56 may be inserted into the first biasing member 40 and the second biasing member 45. The end lock 29 fitted into the shaft 56 may be inserted into the second biasing member 45.

The second biasing member 45 may be positioned between the bottom 242 of the tube part 24 of the cover 20 and the upper part 292 of the end lock 29 in a compressed state in the vertical direction D2. In this case, a restoring force to extend in the vertical direction D2 generates in the second biasing member 45. As described above, the end lock 29 is fixed to the case 50. Therefore, the restoring force of the second biasing member 45 acts as a biasing force to bias the cover 20 toward the case 50.

As illustrated in FIGS. 8 and 9, the first biasing member 40 is provided to the cover 20 and the case 50 in a state where restoring force R in the rotation direction D1 generates in the closed position. As illustrated in FIG. 9, the first locks 26 of the cover 20 in the closed position engage with the stoppers 57 of the case 50 in the rotation direction D1. The engagement between the first locks 26 and the stoppers 57 prevents the restoring force R from rotating the cover 20. It should be noted that in FIG. 8, the first biasing member 40 is viewed from below, and the direction of the restoring force R in FIG. 8 is thus opposite to the direction of the restoring force R in FIG. 9.

As illustrated in FIG. 9, the second locks 27 of the cover 20 may have a height H2 greater than a height H1 of the first locks 26. As illustrated in FIG. 9, the second locks 27 may extend downward further than the first locks 26 in the vertical direction D2.

Next, an example of operation of the pressure relief valve 10 will be described. It is assumed that the pressure relief valve 10 is attached to a battery pack.

In normal operation of the battery pack, the cover 20 is in the closed position illustrated in FIG. 1 and FIGS. 7 to 9. The cover 20 is biased in the rotation direction D1 by the first biasing member 40. Meanwhile, the first locks 26 of the cover 20 engage with the stoppers 57 of the case 50 in the rotation direction D1. The cover 20 cannot rotate in the rotation direction D1, which thus maintains a state where the openings 23 of the cover 20 do not overlap the openings 53 of the case 50, as illustrated in FIG. 1 and FIGS. 7 to 9. In addition, the second biasing member 45 generates the biasing force to bias the cover 20 toward the housing 100. Therefore, the openings 53 of the case 50 are sealed by the lower face 21 of the cover 20 and the second seals 35.

Figure 10:
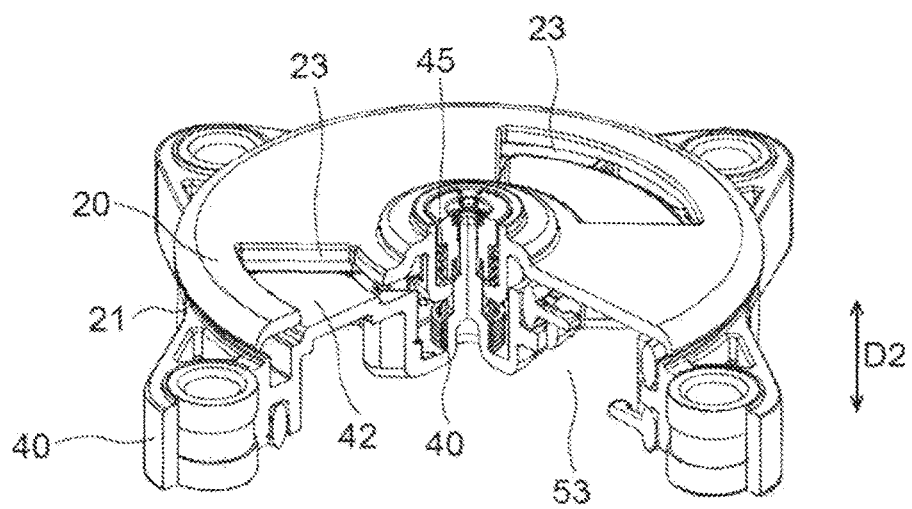
FIG. 10 is a partial sectional view illustrating the pressure relief valve in a state where the cover is in an upper position.
Figure 11:
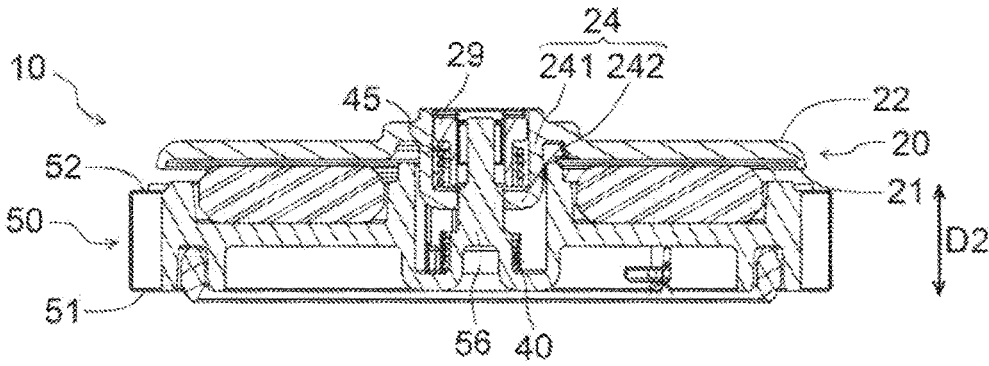
FIG. 11 is a vertical sectional view illustrating the pressure relief valve in a state where the cover is in the upper position.
Figure 12:
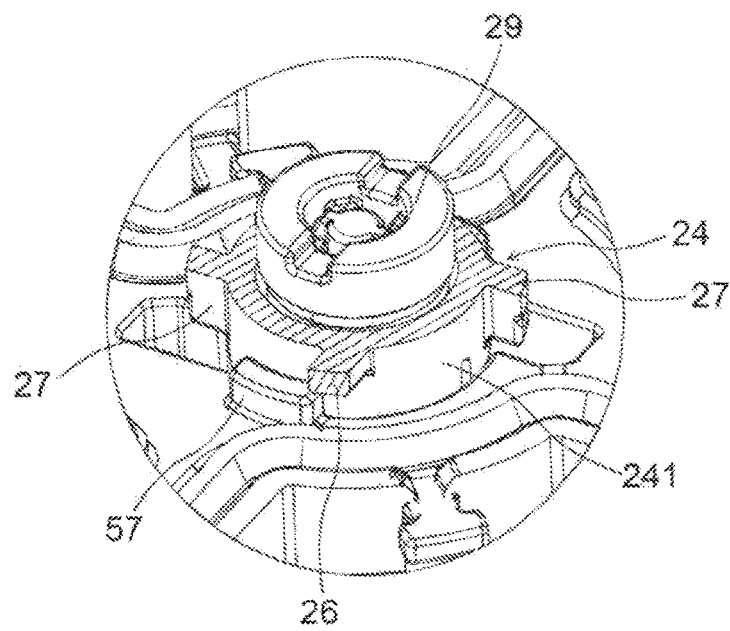
FIG. 12 is a view illustrating the tube part and the locks in a state where the cover is in the upper position.

When the internal pressure of the housing 100 of the battery pack exceeds a predetermined threshold value, the force applied to the cover 20 by the internal pressure is greater than the force applied to the cover 20 by the second biasing member 45. As a result, the cover 20 moves upward from the lower position. The cover 20 moves upward to the upper position where the force applied to the cover 20 by the internal pressure and the force applied to the cover 20 by the second biasing member 45 are balanced. FIG. 10 is a partial sectional view illustrating the pressure relief valve 10 in a state where the cover 20 is in the upper position. FIG. 11 is a vertical sectional view illustrating the pressure relief valve 10 in a state where the cover 20 is in the upper position. FIG. 12 is a view illustrating the tube part 24 and the locks 26, 27 in a state where the cover 20 is in the upper position.

As illustrated in FIG. 12, when the cover 20 moves to the upper position, the engagement between the stoppers 57 of the case 50 and the first locks 26 of the cover 20 is released. This allows the cover 20 in the upper position to rotate in the rotation direction D1 to the open position by the biasing force of the first biasing member 40.

Figure 13:
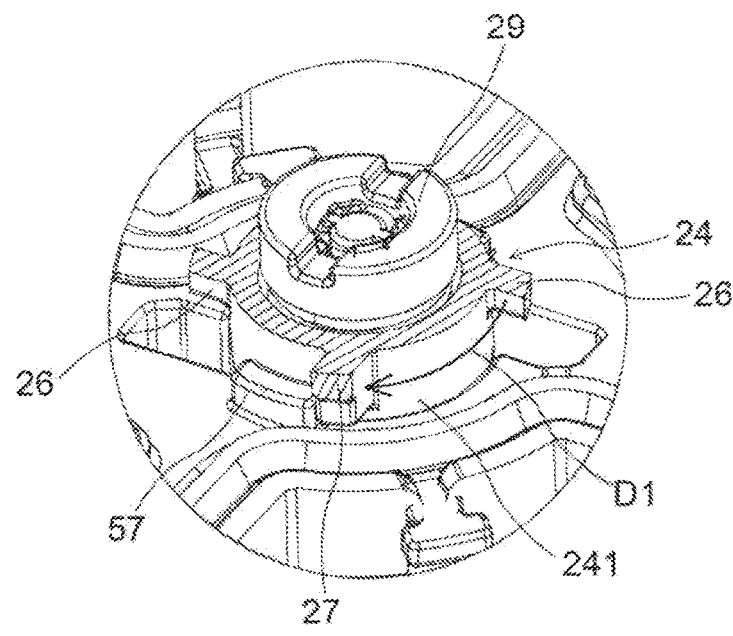
FIG. 13 is a view illustrating the tube part and the locks in a state where the cover is in an open position.
Figure 14:
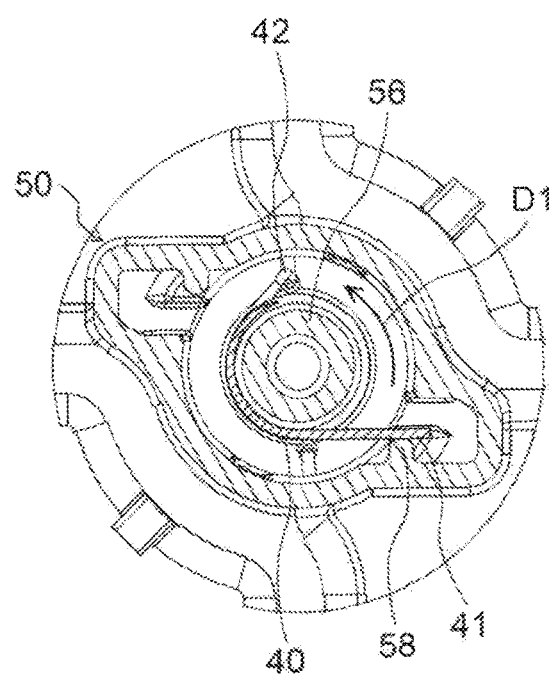
FIG. 14 is a sectional view illustrating the first biasing member in a state where the cover is in the open position.

FIG. 13 is a view illustrating the tube part 24 and the locks 26, 27 in a state where the cover 20 is in the open position. As illustrated in FIG. 13, when the cover 20 rotates to the open position, the second locks 27 of the cover 20 engage with the stoppers 57 of the case 50. This stops the rotation of the cover 20. FIG. 14 is a sectional view illustrating the first biasing member 40 in a state where the cover 20 is in the open position. In FIG. 14, the first biasing member 40 is viewed from below, and the direction of the rotation direction D1 in FIG. 14 is thus opposite to the direction of the rotation direction D1 in FIG. 13. The positional relationship of the first locks 26 and the second locks 27 may be defined such that in the open position, the second seals 35 enclose the openings 23 in a plan view.

Figure 15:
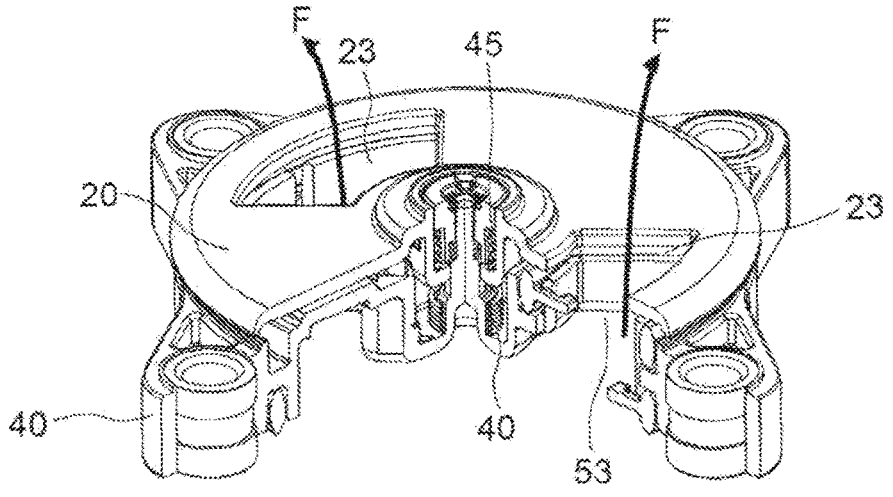
FIG. 15 is a partial sectional view illustrating the pressure relief valve in a state where the cover is in the open position.

FIG. 15 is a partial sectional view illustrating the pressure relief valve 10 in a state where the cover 20 is in the open position. The openings 23 of the cover 20 overlap the openings 53 of the case 50 in the open position. This allows the fluid inside the housing 100 to be discharged to the outside through the vent 103 of the housing 100, the openings 53 of the case 50, and the openings 23 of the cover 20.

The internal pressure decreases as the fluid is discharged to the outside. When the force applied to the cover 20 by the internal pressure becomes smaller than the force applied to the cover 20 by the second biasing member 45, the cover 20 moves to the lower position by the restoring force of the second biasing member 45. Meanwhile, the second locks 27 of the cover 20 continue to engage with the stoppers 57 of the case 50. The cover 20 cannot rotate in the rotation direction D1, which thus maintains a state where the openings 23 of the cover 20 overlap the openings 53 of the case 50.

In the present embodiment, the fluid inside the housing 100 can reach outside through the openings 53 of the case 50 and the openings 23 of the cover 20, as described above. Therefore, a flow rate of the fluid can be increased as compared with the above-described case of Patent Literature 1, where the fluid passes through a small gap in the vertical direction between the base and the cover to the outside. This allows the internal pressure of the housing 100 to be reduced quickly.

In addition, in the present embodiment, since the gap in the vertical direction between the base and the cover is not used as a flow path of the fluid, an amount of movement of the cover 20 in the vertical direction can be thus reduced as compared with that of conventional pressure relief valve. Therefore, the dimension of a space allocated to the pressure relief valve 10 in the vertical direction can be made smaller than that of conventional pressure relief valve. This allows for a higher degree of freedom in designing a layout in the vertical direction.

The above-described embodiment can be variously modified. A modification example will now be described with reference to the drawings as necessary. In the following description and the drawings used in the following description, the same reference signs as those used for the corresponding parts in the above-described embodiment are used for the parts that can be the same in the above-described embodiment, and overlapped description is omitted. In addition, when it is obvious that the effect obtained in the above-described embodiment is also obtained in the modification example, its description may be omitted.

In the example illustrated in the above-described embodiment, the engagement between the first locks 26 of the cover 20 and the stoppers 57 of the case 50 in the rotation direction D1 is maintained by the second biasing member 45 when the internal pressure of the housing 100 is lower than a threshold value. However, means for maintaining the engagement between the cover 20 and the case 50 when the internal pressure of the housing 100 is lower than a threshold value is not limited to the biasing force in the vertical direction by the second biasing member 45. For example, although not illustrated, the engagement between the cover 20 and the case 50 may be maintained by mechanical engagement in the vertical direction. In this case, the mechanical engagement in the vertical direction is released when the internal pressure of the housing 100 exceeds a threshold value. The mechanical engagement is, for example, engagements using claws.

REFERENCE SIGNS LIST

10 Pressure relief valve
20 Cover
23 Opening
24 Tube part
26 First lock
27 Second lock
29 End lock
30 First seal
35 Second seal
40 First biasing member
45 Second biasing member
50 Case
53 Opening
56 Shaft
57 Stopper
58 Support
100 Housing
103 Vent

What is claimed is:

1. A pressure relief valve configured to release fluid from a housing when internal pressure of the fluid inside the housing increases, the pressure relief valve comprising:
    a case including an opening and configured to be fixed to a surface of the housing;
    a cover supported by the case rotatably in a rotation direction parallel to the surface of the housing; and
    a first biasing member for biasing the cover such that the cover rotates from a closed position to an open position in the rotation direction,
    a second biasing member configured to bias the cover in a direction that the cover is directed to the case, wherein the cover covers the opening of the case in the closed position and opens the opening of the case in the open position, the case includes a stopper to engage the cover in the closed position, and the pressure relief valve is configured to release engagement between the stopper and the cover when the internal pressure of the housing exceeds a threshold value.

2. The pressure relief valve according to claim 1, wherein the cover includes a first lock engaging the stopper of the case in the closed position.

3. The pressure relief valve according to claim 2, wherein the cover includes a tube part, the case includes a shaft inserted into the tube part and functioning as a rotation shaft in the rotation direction, and the first lock protrudes outward from the tube part.

4. The pressure relief valve according to claim 2, wherein the cover includes a second lock engaging the stopper of the case in the open position.

5. A pressure relief valve configured to release fluid from a housing when internal pressure of the fluid inside the housing increases, the pressure relief valve comprising:

a case including an opening and configured to be fixed to a surface of the housing;

a cover supported by the case rotatably in a rotation direction parallel to the surface of the housing; and a first biasing member for biasing the cover such that the cover rotates from a closed position to an open position in the rotation direction, wherein the cover covers the opening of the case in the closed position and opens the opening of the case in the open position, the case includes a stopper to engage the cover in the closed position, and the pressure relief valve is configured to release engagement between the stopper and the cover when the internal pressure of the housing exceeds a threshold value, the cover includes a first lock engaging the stopper of the case in the closed position, the cover includes a tube part, the case includes a shaft inserted into the tube part and functioning as a rotation shaft in the rotation direction, and the first lock protrudes outward from the tube part.

6. A pressure relief valve configured to release fluid from a housing when internal pressure of the fluid inside the housing increases, the pressure relief valve comprising:

a case including an opening and configured to be fixed to a surface of the housing;

a cover supported by the case rotatably in a rotation direction parallel to the surface of the housing; and a first biasing member for biasing the cover such that the cover rotates from a closed position to an open position in the rotation direction, wherein the cover covers the opening of the case in the closed position and opens the opening of the case in the open position, the case includes a stopper to engage the cover in the closed position, and the pressure relief valve is configured to release engagement between the stopper and the cover when the internal pressure of the housing exceeds a threshold value, the cover includes a first lock engaging the stopper of the case in the closed position, and the cover includes a second lock engaging the stopper of the case in the open position.

* * * * *